(12) United States Patent
Ohno

(10) Patent No.: US 7,498,700 B2
(45) Date of Patent: Mar. 3, 2009

(54) LINEAR DRIVE SYSTEM

(75) Inventor: Masaki Ohno, Kamakura (JP)

(73) Assignee: Nippon Thompson Co., Ltd., Tokyo (JP)

( * ) Notice: Subject to any disclaimer, the term of this patent is extended or adjusted under 35 U.S.C. 154(b) by 147 days.

(21) Appl. No.: 11/534,044

(22) Filed: Sep. 21, 2006

(65) Prior Publication Data

US 2007/0075592 A1 Apr. 5, 2007

(30) Foreign Application Priority Data

Sep. 30, 2005 (JP) ............................. 2005-286697

(51) Int. Cl.
*H02K 41/00* (2006.01)
(52) U.S. Cl. ....................................................... 310/12
(58) Field of Classification Search ................ 310/12
See application file for complete search history.

(56) References Cited

U.S. PATENT DOCUMENTS 4,999,530 A * 3/1991 Azuma et al. .................. 310/12

FOREIGN PATENT DOCUMENTS

| JP | 2000-201471 | * | 11/1999 |
| JP | 2001-352744 A | | 12/2001 |
| JP | 2007-97372 | * | 9/2005 |

* cited by examiner

*Primary Examiner*—Nguyen N Hanh
(74) *Attorney, Agent, or Firm*—WolfBlock LLP

(57) ABSTRACT

An improvement in high-speed and response performances is achieved with simple structure. A bed faces a movable table on which permanent magnets divided from each other in a stroke direction of the movable table are provided. One or more armature coils are provided on the bed facing the permanent magnets. Upon passage of an electric-current through the armature coils, an electromagnetic interaction between the armature coil current and magnetic fluxes of the permanent magnets produces a thrust force for relative movement between the two mobile units. A magnetic member is provided on the movable table in a position corresponding to a maximum point or a vicinity thereof of a magnetic force of the permanent magnets when the movable table is in a neutral position in the stroke direction. When the mobile units relatively move from the neutral position, the magnetic force of the permanent magnets acts on the magnetic member.

6 Claims, 14 Drawing Sheets

Fig. 14  *Prior Art*
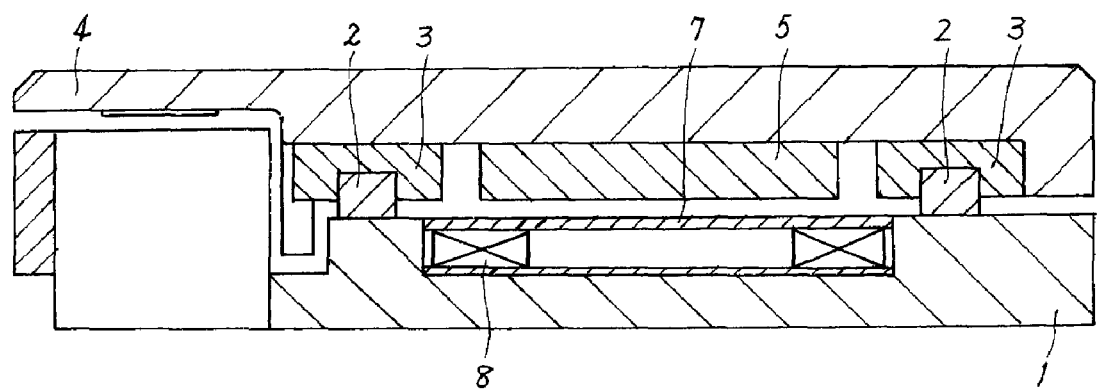

LINEAR DRIVE SYSTEM

BACKGROUND OF THE INVENTION

1. Field of the Invention

This invention relates to a linear drive system including linear motor essentially consisting of a permanent magnet and an armature coil.

2. Description of the Related Art

As one of the conventional drive system of the type described above, the invention disclosed in JP-A-2001-352744 is known. The conventional drive system is illustrated in FIGS. 13, 14. As is clear from these diagrams, a conventional linear drive system has a pair of parallel track rails 2 laid on a bed 1 made of a ferromagnetic material. A plurality of sliders 3 are movably provided on the track rails 2. A movable table 4 made of a ferromagnetic material is fixed to the sliders 3 so that the movable table 4 can reciprocate on the track rails 2.

A plurality of permanent magnets 5 are arranged on the face of the movable table 4 facing the bed 1 in a direction of movement of the movable table 4. Each of the permanent magnets 5 is formed in a rectangular plate shape. Each of the permanent magnets 5 has a north pole and a south pole at its respective sides in the up-down direction in which the movable table 4 is located on the permanent magnet 5. The adjacent permanent magnets 5 arranged in the direction of movement of the movable table 4 are opposite in polarity to each other. The movable table 4 is formed of a ferromagnetic material in order that the movable table 4 can function as a magnet yoke through which a magnetic flux flows from the permanent magnets 5.

On the bed 1, on the other hand, a recess 6 is formed in a portion between the pair of track rails 2 and extends in the longitudinal direction of the track rails 2. The recess 6 is covered with a coil substrate 7. In turn, a plurality of armature coils 8, which take the form of three-phase cureless coils, is installed under the coil substrate 7. The armature coils 8 are arranged in a row along the longitudinal direction of the recess 6. Upon the application of three-phase current to the armature coils 8, the electromagnetic interaction between the magnetic fluxes of the permanent magnets 5 and the three-phase current passing through the armature coils 8 results in the movement of the movable table 4 with the sliders 3 on the track rails 2. Accordingly, the permanent magnets 5 and the armature coils 8 form a linear motor. The bed 1 is formed of a ferromagnetic material in order that the bed 1 can function as a yoke of the armature coils 8.

In a conventional system as described above, upon the application of current to the armature coils 8, the movable table 4, together with the sliders 3, is moved on the track rails 2 by the electromagnetic interaction between the magnetic fluxes of the permanent magnets 5 and the three-phase current passing through the armature coils 8. Recently, the drive system has been increasingly required to increase in speed and response. In order to address these needs, an increase in the thrust of the drive system is necessary. To increase the thrust, a reduction in the weight of the movable table 4, an increase in the magnetic force of the permanent magnet or an increase in the electric current applied is required.

The reduction of the weight of the movable table 4 needs a reduction in the thickness thereof. However, a reduction in the thickness of the movable table 4 involves inferiority in rigidity, leading to a warp in the movable table 4. Such a warp in the movable table 4 gives rise to degradation in performance.

Regarding another possible means of increasing the magnetic force of the permanent magnet 5, the magnets currently used for systems as described above have a significantly strong magnetic force. This makes it close to impossible under the present circumstances to use any magnet with a stronger magnetic force. An example of possible approaches for obtaining a strong magnetic force is an increase in size of the permanent magnet 5 or the armature coil 8. However, an increase in size of such a component involves an increase in mass of the component. Accordingly, even if the thrust can be increased, the increased thrust is wasted for the increased mass. In consequence, the increase in the magnetic force of the permanent magnet 5 is limited under the present circumstances.

As the electric current applied to the armature coils is increased in order to obtain a strong magnetic force, the amount of heat generated increases. If the amount of heat generated increases, the armature coils 8 may burn due to this heat, for example. In consequence, the increase in electric current applied is limited.

In either case, the conventional drive systems have limits for the achievement of speedups or fast response.

SUMMARY OF THE INVENTION

It is an object of the present invention to provide a linear drive system capable of dramatically improving high speed performance and response performance with simple structure.

The present invention provides a linear drive system which has a pair of first and second opposing mobile units, a plurality of permanent magnets provided on the first mobile unit and divided from each other in a stroke direction of the first mobile unit, and one or more armature coils provided on the second mobile unit and facing the permanent magnets, in which when an electric current is passed through the armature coils, an electromagnetic interaction between the armature-coil current and magnetic fluxes of the permanent magnets produces a thrust force used for relative movement between the first and second mobile units.

A feature of the linear drive system of the present invention is a magnetic member that is provided on the second mobile unit and in a position corresponding to either a maximum point or a vicinity of the maximum point of a magnetic force of the permanent magnets when the second mobile unit is in a neutral position in the stroke direction. When the first and second mobile units relatively move from the neutral position, the magnetic force of the permanent magnets acts on the magnetic member.

Note that the "maximum point" is a mathematical term and has different meanings from "strongest". For example, a plurality of permanent magnets is provided in the present invention. There may be a maximum point for each of the permanent magnets. In the present invention, the magnetic member can face any permanent magnet if the magnetic member is in a position corresponding to a maximum point or the vicinity of the maximum point of the magnetic force.

A feature of the linear drive system of the present invention is that the magnetic member is provided on the second mobile unit and in a position corresponding to either a maximum point or the vicinity of the maximum point of the magnetic force of the permanent magnets when the first mobile unit is in the neutral position in the stroke direction, and has a sufficient width to be affected by magnetic lines of a pair of adjacent flux loops alone of flux loops respectively generated between pairs of adjacent permanent magnets. A magnetic line of the permanent magnet which is at a distance from the magnetic member may possibly affect the magnetic member, but the magnetic line has little effect on the movement of the mobile unit. Accordingly, the sufficient "width" to be affected by the magnetic lines of a pair of adjacent flux loops alone means the sufficient "width" to be substantially affected by the magnetic lines.

A feature of the linear drive system of the present invention is that the magnetic member is constituted of a pair of first and second magnetic members, and the first and second magnetic members are provided in relational positions which are respectively outside the outermost armature coils on the second mobile unit and respectively face the outermost permanent magnets which are provided on the first mobile unit, and when the first and second mobile units relatively move a full stroke, the first magnetic member is in a position facing a boundary between a pair of permanent magnets and the second magnetic member is in a position where the second magnetic member is not or seldom affected by the magnetic flux of the corresponding outermost permanent magnet.

A feature of the linear drive system of the present invention is that the magnetic member extends through the second mobile unit and projects from a face of the second mobile unit facing the permanent magnets provided on the first mobile unit.

According to the present invention, when both the mobile units relatively move from the neutral position, the magnetic forces of the permanent magnets act on the magnetic member. The acting force results in a force in a direction opposite to the moving direction of the first mobile unit when the first mobile unit moves from the neutral position to a stroke end. When the first mobile unit moves from the stroke end toward the neutral position, the acting force results in a force in a forward direction with respect to the moving direction of the first mobile unit. Thus, the force in the opposite direction acts as a damping force on the first mobile unit and the force in the forward direction results in a force thrusting the first mobile unit in the moving direction. In consequence, without an increase in size of a permanent magnet and/or an armature coil, the improvements of high-speed performance and response performance can be achieved.

Further, according to the present invention, because, when both the mobile units are in the neutral position, the two magnetic loops passing through the magnetic member are bilaterally symmetric with respect to the magnetic member, a high stability in the neutral position is achieved.

Still further, according to the present invention, a long stroke of movement of the mobile unit is provided.

Yet further, according to the present invention, the magnetic member is easily mounted on the mobile unit, and also on an existing mobile unit.

BRIEF DESCRIPTION OF THE DRAWINGS

FIG. 14 is a sectional view taken along the XIV-XIV line in FIG. 13.

DETAILED DESCRIPTION OF THE PREFERRED EMBODIMENTS

Figure 1:
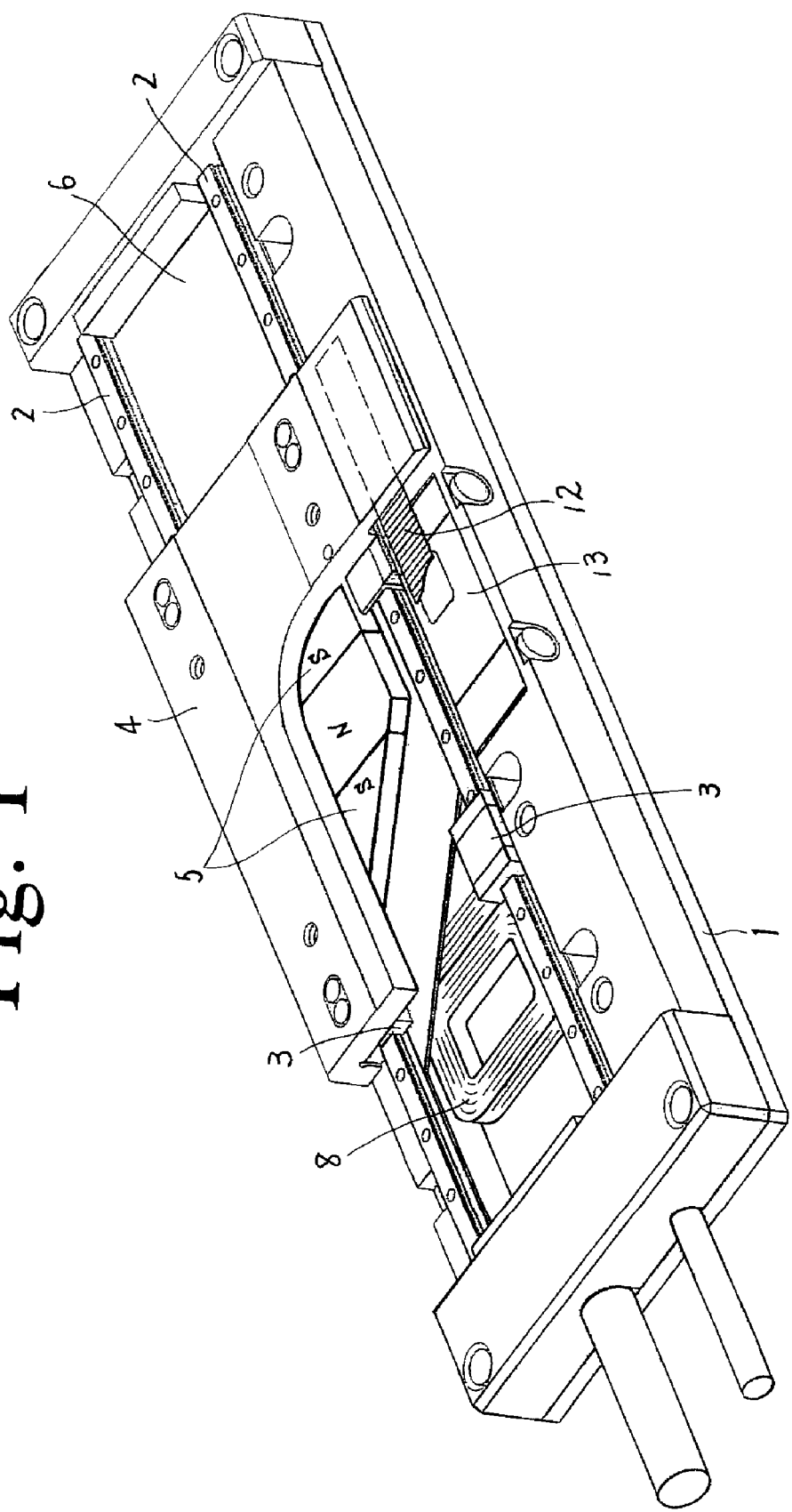
FIG. 1 is a partially enlarged perspective view illustrating a bed with a movable table mounted thereon in a first embodiment according to the present invention.
Figure 2:
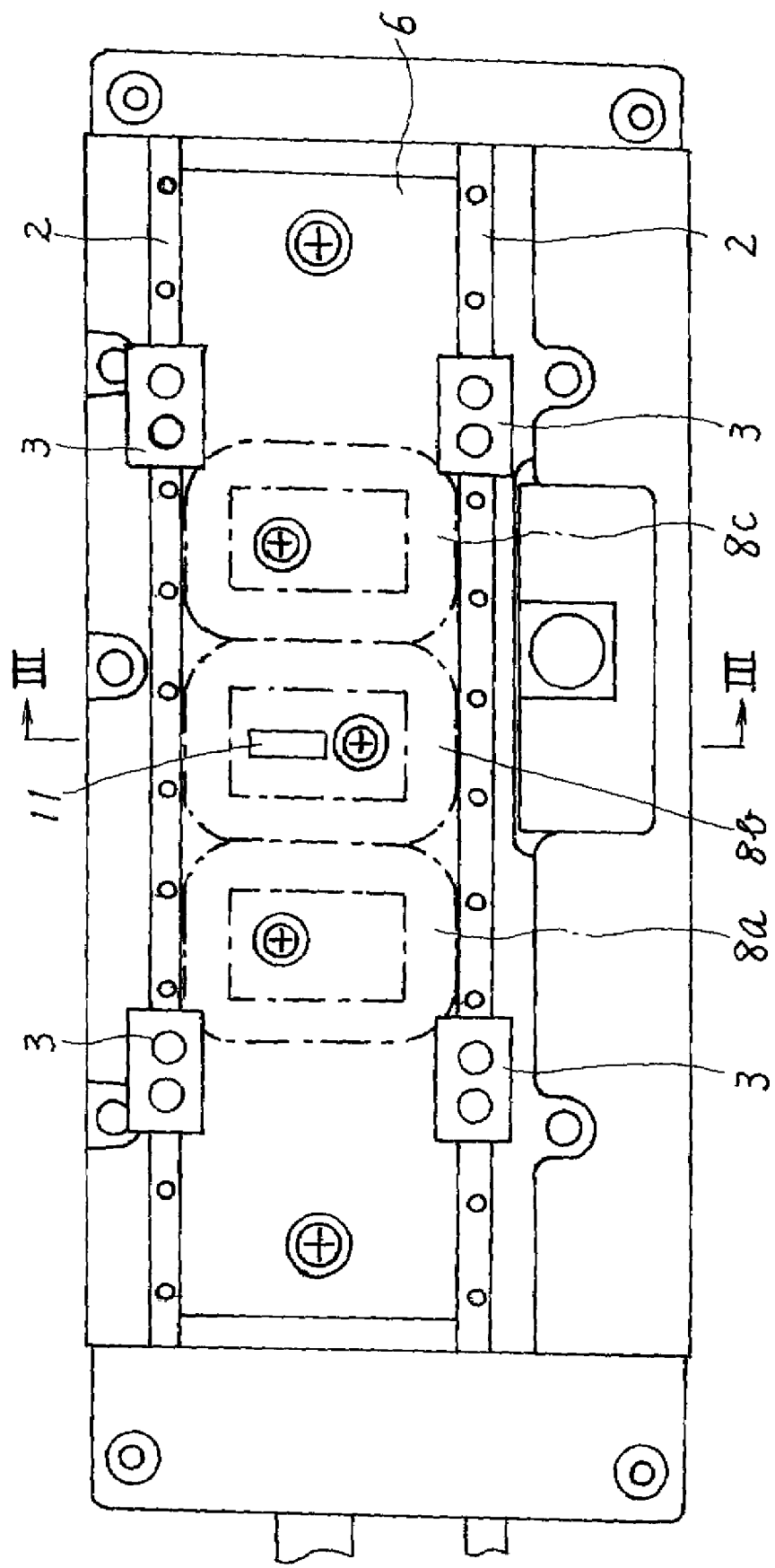
FIG. 2 is a plan view of the bed without the movable table in the first embodiment.
Figure 3:
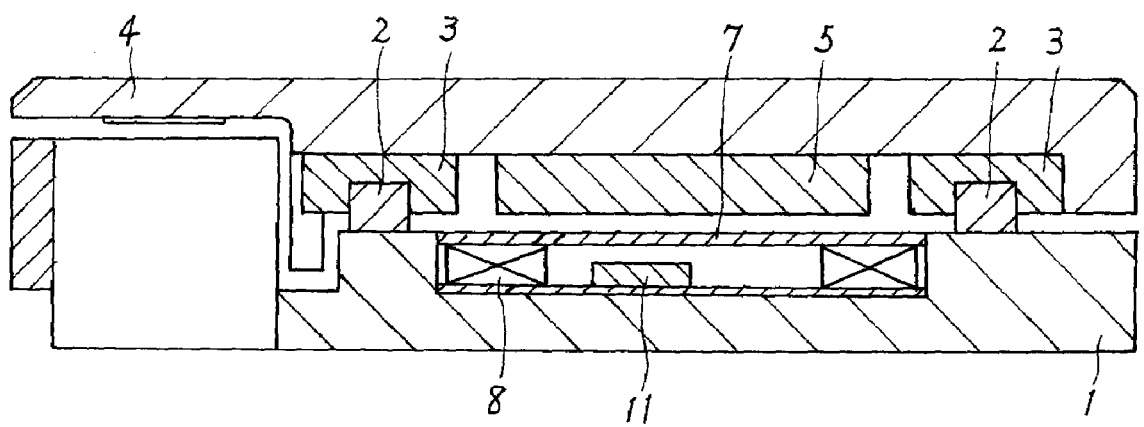
FIG. 3 is a sectional view taken along the III-III line in FIG. 2.

A principal feature of a first embodiment illustrated in FIGS. 1 to 7 is that a magnetic member 11 described later in detail is provided in a central portion of a bed 1 which corresponds to a second mobile unit of the present invention. Apart from the foregoing, the structure of the first embodiment is approximately the same as the conventional structure. Overlaps of the conventional structure and the structure according to the first embodiment will be described below in detail.

In the first embodiment illustrated in FIGS. 1 to 7, a pair of track rails 2 extending parallel to each other is laid on the bed 1 made of a ferromagnetic material. A plurality of sliders 3 are movably provided on the track rails 2. A movable table 4 made of a ferromagnetic material is fixed to the sliders 3 so that the movable table 4, together with the sliders 3, can reciprocate on the track rails 2.

The bed 1 form a second mobile unit of the present invention and the movable table 4 form a first mobile unit of the present invention.

On the face of the movable table 4 facing the bed. 1, five permanent magnets 5 are arranged in a row in a direction of movement of the movable table 4. Each of the permanent magnets 5 is formed in a rectangular plate shape. Each of the permanent magnets 5 has a north pole and a south pole at its respective sides in the up-down direction in which the movable table 4 is located on the permanent magnet 5. The adjacent permanent magnets 5 arranged in the direction of movement of the movable table 4 are opposite in polarity to each other. The movable table 4 is formed of a ferromagnetic material in order that the movable table 4 can function as a magnet yoke through which a magnetic flux flows from the permanent magnets 5.

On the bed 1, on the other hand, a recess 6 is formed in a portion of the bed 1 between the pair of track rails 2 and extends in the longitudinal direction of the track rails 2. The recess 6 is covered with a coil substrate 7. In turn, a plurality of armature coils 8, which take the form of three-phase coreless coils, is installed under the coil substrate 7. The armature coils 8 are arranged in a row along the longitudinal direction of the recess 6. Upon the application of three-phase current to the armature coils 8, the electromagnetic interaction between the magnetic fluxes of the permanent magnets 5 and the three-phase current passing through the armature coils 8 results in the movement of the movable table 4 with the sliders 3 on the track rails 2. Accordingly, the permanent magnets 5 and the armature coils 8 form a linear motor. The bed 1 is formed of a ferromagnetic material in order that the bed 1 can function as a yoke of the armature coils 8.

Further, an optical linear scale 12 is provided on the underside of the movable table 4. An optical encoder 13 is provided on the bed 1. The optical linear scale 12 and the optical encoder 13 are provided for detecting a moving position of the movable table 4.

Figure 4:
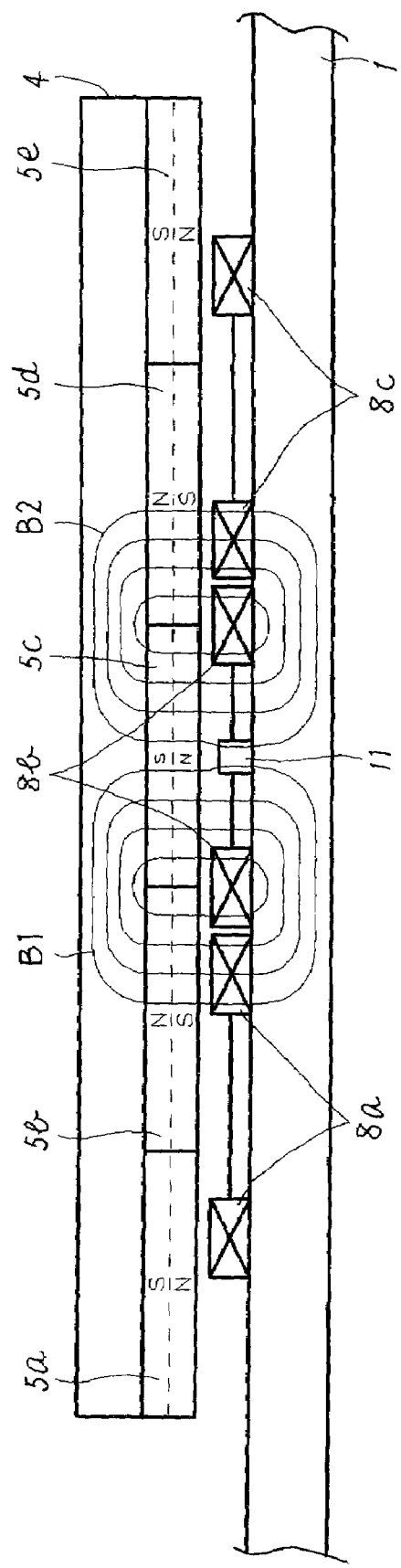
FIG. 4 is a diagram illustrating a relative position of the bed and the movable table which is in the neutral position in the first embodiment.
Figure 5:
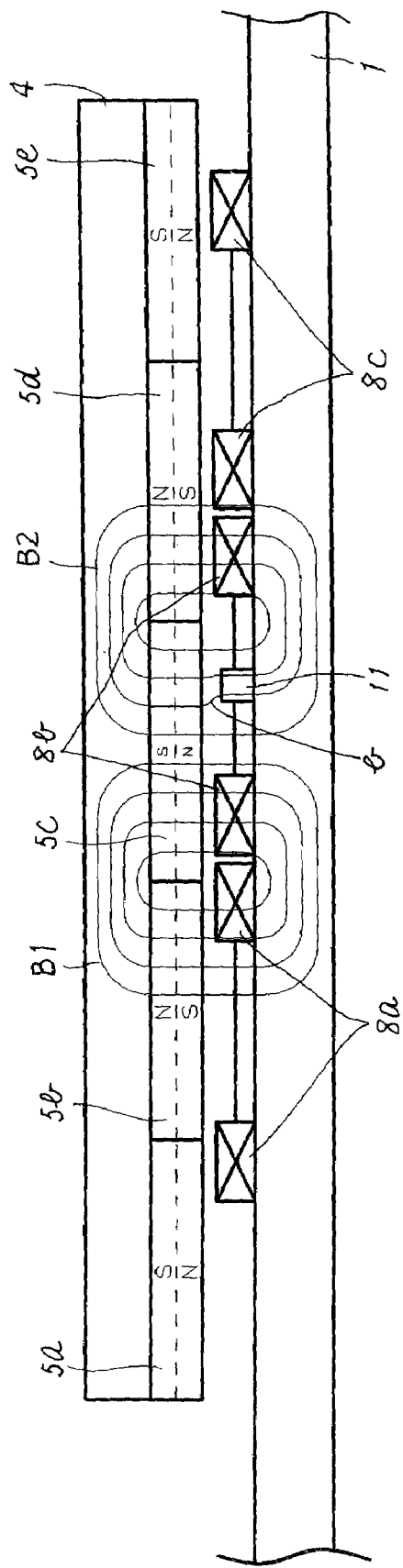
FIG. 5 is a diagram illustrating a relative position of the bed and the movable table moved slightly from the neutral position in the first embodiment.
Figure 6:
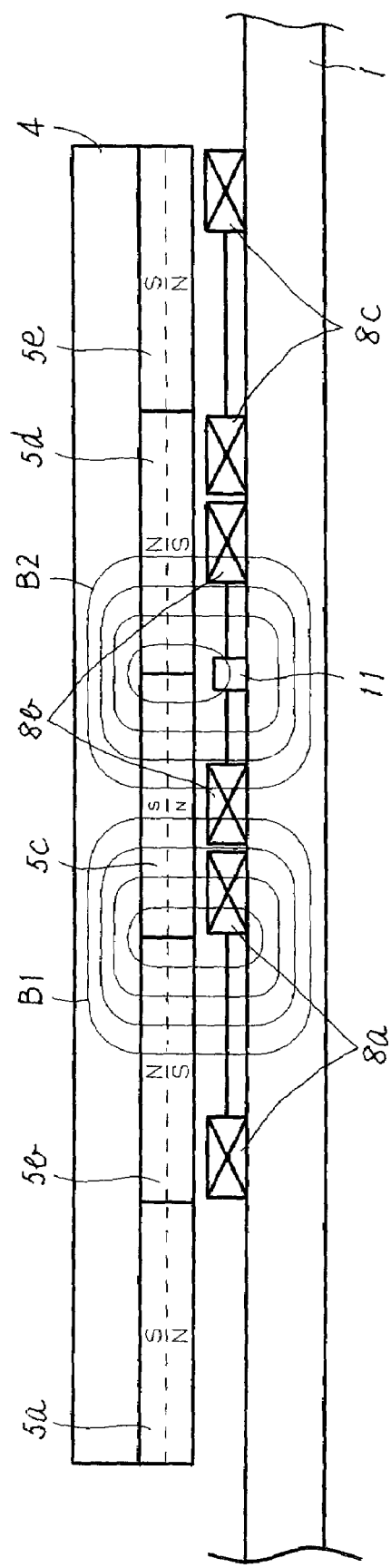
FIG. 6 is a diagram illustrating a relative position of the bed and the movable table at a stroke end in the first embodiment.

The foregoing magnetic member 11 is provided on the bed 1 which corresponds to the second mobile unit of the present invention in such a manner as to maintain relational positions shown in FIGS. 4 to 6. FIGS. 4 to 6 show the relative positions of the bed 1 and the movable table 4. The bed 1 has three armature coils 8a, 8b and 8c arranged in a row in the longitudinal direction of a recess 6 as described earlier. The five permanent magnets 5a, 5b, 5c, 5d and 5e are likewise arranged in a row in the longitudinal direction on the underside of the movable table 4. The recess 6 is omitted in FIGS. 4 to 6.

The magnetic member 11 is fixed in a central position of the inside of the middle armature coil 8b of the row of armature coils 8a to 8c. When the movable table 4 is in a neutral position shown in FIG. 4, the magnetic member 11 faces the center of the middle permanent magnet 5c of the row of permanent magnets 5a to 5e. A flux loop (of magnetic lines) B1 generated between the permanent magnets 5b and 5c and a flux loop B2 generated between the permanent magnets 5c and 5d pass through the center of the permanent magnet 5c facing the magnetic member 11 in a direction at approximately right angles to the magnetic member 11, resulting in the strongest magnetic force of the permanent magnet 5c. Accordingly, this means the agreement between a maximum point and the strongest point of the magnetic force.

The magnetic member 11 has a width extending over only the pair of adjacent flux loops B1 and B2 of the flux loops generated between the respective pairs of adjacent permanent magnets. In other words, the magnetic member 11 does not have a width extending to a flux loop which is adjacent to one of the flux loops adjacent to each other.

When the movable table 4 is in the neutral position shown in FIG. 4, the flux loop B1 emerging from the permanent magnets 5b and 5c and the flux loop B2 emerging from the permanent magnets 5c and 5d pass through the magnetic member 11, and also the fluxes passing through the magnetic member 11 are bilaterally symmetric in the magnetic member 11. As a result of such emergence of the bilaterally symmetric fluxes, the force relationship remains stable in the bilateral direction. In other words, according to the first embodiment, the movable table 4 is able to stably maintain the neutral position.

Then, if the movable table 4 moves from the neutral position toward the left direction in FIG. 4, the stable state of the magnetic fluxes with respect to the magnetic member 11, which is kept in the neutral position, is disrupted during the movement of the movable table 4. In addition, as shown in FIG. 5, the magnetic flux of the flux loop B2 alone passes through the magnetic member 11. At this point, a portion b of the magnetic flux enters the magnetic member 11 from an oblique direction with respect to the magnetic member 11. The portion b of the magnetic flux acts as a resistance to the foregoing movement of the movable table 4 in the left direction. Accordingly, in a stage when the movable table 4 moves from the neutral position in either the right or left direction, the force by the portion b of the magnetic flux acts as a resistance to the movement of the movable table 4, so that a decelerating effect is exerted on the movable table 4. On the other hand, when the movable table 4 changes direction and moves, the force by the portion b of the magnetic flux acts as a thrust force in the forward direction.

When the movable table 4 moves further toward the left direction from the position shown in FIG. 5, the magnetic member 11 faces the boundary between permanent magnets 5c and 5d. This position is a stroke end of the movable table 4. When the magnetic member 11 faces the boundary between the permanent magnets 5c and 5d, the magnetic flux passes through the magnetic member 11 from approximately the stroke direction. As a result, the attraction force of the permanent magnets for the magnetic member 11 alone acts on the movable table 4. Accordingly, the movable table is able to be smoothly moved from the above stroke end with a slight force.

The operation in the first embodiment will be described below.

The armature coils 8a to 8c are connected to a power source (not shown), and a controller (not shown) is used to control a three-phase electric current for application to the armature coils 8a to 8c. By applying the three-phase electric current to the armature coils 8a to 8c, the electromagnetic interaction between the magnetic fluxes of the permanent magnets 5 as described above and the three-phase electric current passing through the armature coils 8 allows the movable table 4 to move on the track rails 2. At this point, a direction of the movement of the movable table 4 depends on a direction of the electric current.

In the first embodiment, an operation pattern is set as follows:

| | |
|---|---|
| stroke | 9 mm, |
| load of movable table | 0.3 kg, |
| maximum velocity | 300 mm/sec, |
| acceleration and deceleration time | 0.02 sec, |
| interval | 0.1 sec, and |
| length of permanent magnet in stroke direction | about 9 mm. |

Figure 7:
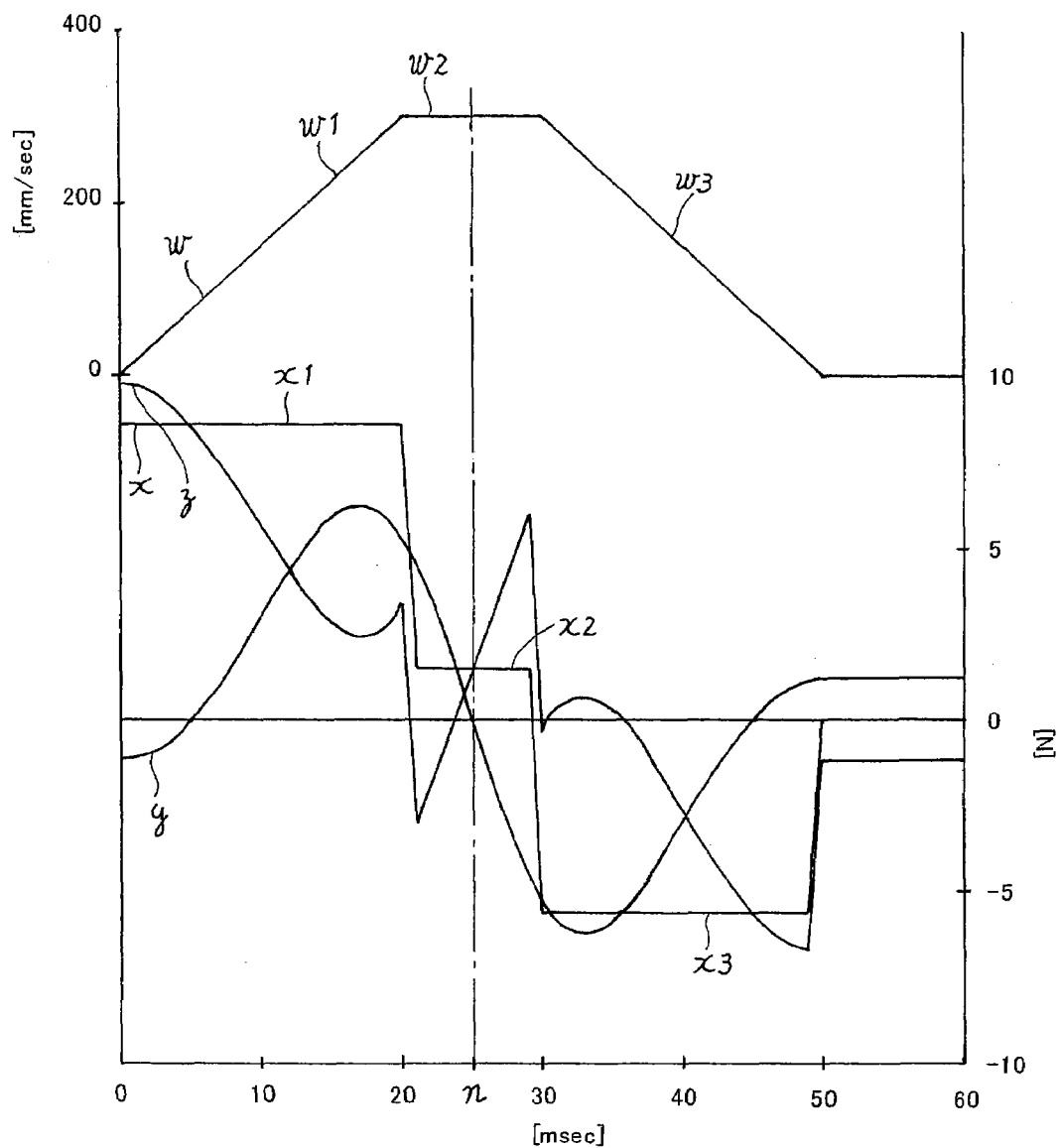
FIG. 7 is a graph showing the relationship between the velocity and the thrust in the first embodiment.

Based on the characteristics chart shown in FIG. 7, a description is given of the case where the movable table 4 moves from the stroke end shown in FIG. 6 toward the opposite direction, namely, the right direction in FIG. 6 under the above conditions. In FIG. 7, the curve w shows the velocity characteristics of the movable table 4, the curve x shows the characteristics of the thrust force of the linear motor, the curve y shows the characteristics of the force by the magnetic flux entering the magnetic member 11 (i.e. auxiliary thrust force), and the curve z shows the characteristics of the thrust force after subtracting the curve y from the curve x. The zero point of the time axis is the time when the movable table 4 is in the aforementioned stroke end.

When the movable table 4 is in the stroke end as described earlier, the magnetic member 11 faces the boundary between the permanent magnets 5c and 5d and the magnetic flux of them passes through the magnetic member 11 from approximately the stroke direction. As a result, the attraction force of the permanent magnets for the magnetic member 11 alone acts on the movable table 4.

For moving the movable table 4, which is in this state as shown in FIG. 6, toward the right direction in FIG. 6 along the velocity characteristics curve w in FIG. 7, the thrust force of the linear motor along the thrust characteristics curve x is necessary. That is, in the acceleration region w1 in which the movable table 4 is accelerated, the linear motor is kept outputting a constant thrust force x1. Then, at the time when the moving velocity of the movable table 4 reaches its peak, the above thrust force is reduced from x1 to x2, and the thrust force x2 is maintained for a predetermined time period, so that the movable table 4 maintains its fastest speed in the parallel region w2 subsequent to the acceleration region w1. The direction of the thrust force of the linear motor is charged from this state until the thrust force reaches x3, whereupon the movable table 4 is decelerated in the decelerationregionw3. Eventually, the thrust force of the linear motor is changed to zero, whereby the movable table 4 stops at a stroke end opposite the stroke end illustrated in FIG. 6. In the moving process from one stroke end to the other stroke end, the point n in FIG. 7 corresponds to the neutral position shown in FIG. 4.

Next, a description will be given of the acting force of the magnetic flux on the magnetic member 11 in the moving process of the movable table 4 in the right direction as described above, on the basis of the auxiliary thrust-force characteristics curve y in FIG. 7. The acting force of the magnetic flux on the magnetic member 11 is in a negative region when the movable table 4 is at the stroke end shown in FIG. 6. In this state, when the movable table 4 moves to the position shown in FIG. 5, a portion b of the magnetic flux enters the magnetic member 11 from an oblique direction. The portion b of the magnetic flux acts as a thrust force in the forward direction on the foregoing movement of the movable table 4 in the right direction. When the movable table 4 further moves toward the neutral position shown in FIG. 4, the auxiliary thrust force y reaches its peak slightly before the neutral position.

After the auxiliary thrust force passes the peak, the acting force of the portion b of the magnetic flux reduces, and at the time when the movable table 4 reaches the neutral point n, the auxiliary thrust force y decreases to zero. After the movable table 4 further moves from the neutral point n toward the right direction in FIG. 4, the auxiliary thrust force y acts as a thrust force in the direction opposite to the moving direction of the movable table 4, that is, as a resistance. This matches the description given of the moving process of the movable table 4 from the position in FIG. 4 to the position in FIG. 5.

Then, eventually, the movable table 4 reaches the stroke end opposite that shown in FIG. 6. Thereupon, as in the case of FIG. 6, the magnetic member 11 faces the boundary between permanent magnets 5c and 5d, and, at this point, the magnetic flux passes through the magnetic member 11 from approximately the stroke direction. As a result, the attraction force of the permanent magnets for the magnetic member 11 alone acts on the movable table 4.

The characteristics graph z in FIG. 7 shows the thrust force characteristics which is obtained by subtracting the characteristics of the auxiliary thrust force y produced by the action of the magnetic flux on the magnetic member 11 from the thrust force x of the linear motor as described earlier. At this point, a value of the effective auxiliary thrust force z was 3.07N, and a value of the effective thrust force of the linear motor alone without the magnetic member 11 was 3.83N. In this manner, the effective auxiliary thrust force is smaller than the effective thrust force. This means that a reduction in energy gained by electric power or the like is possible. Accordingly, if the amount of energy supply is approximately the same as in the conventional case, an increase in the speed of movement of the movable table 4 and an improvement of response performance can be achieved.

Regarding a magnetic member in the first embodiment, if, when the movable table 4 is in the neutral position in the stroke direction, the magnetic member 11 is placed between and allows the passage of the pair of adjacent flux loops B1 and B2 of the flux loops generated between the respective pairs of adjacent permanent magnets, and also the magnetic loops B1 and B2 are symmetric with respect to the magnetic member 11, the magnetic member 11 may be placed in any position and/or may be provided in plural.

FIGS. 8 to 11 illustrate a second embodiment of the present invention. The basic structure including the bed 1 and the movable table 4 in the second embodiment is the same as that in the first embodiment. In other words, the second embodiment differs from the first embodiment in that a pair of magnetic members 14 and 15 are provided and respectively placed outside the outermost armature coils 8a and 8c. When the movable table 4 is in the neutral position, the magnetic members 14 and 15, which are placed outside the armature coils 8a and 8c, maintain the respective relational positions facing the outermost permanent magnets 5a and 5e. When the movable table 4 reaches a stroke end, either the magnetic member 14 or 15 faces the boundary between either a pair of the permanent magnets 5a and 5b or a pair of the permanent magnets 5d and 5e, and the other magnet member 14 or 15 is placed in a position where the magnet member is not or seldom affected by the outermost magnetic flux between the permanent magnets 5d and 5e or the permanent magnets 5a and 5b.

Apart from the foregoing, the structure of the second embodiment is the same as that of the first embodiment, and the detailed description is omitted.

Figure 8:
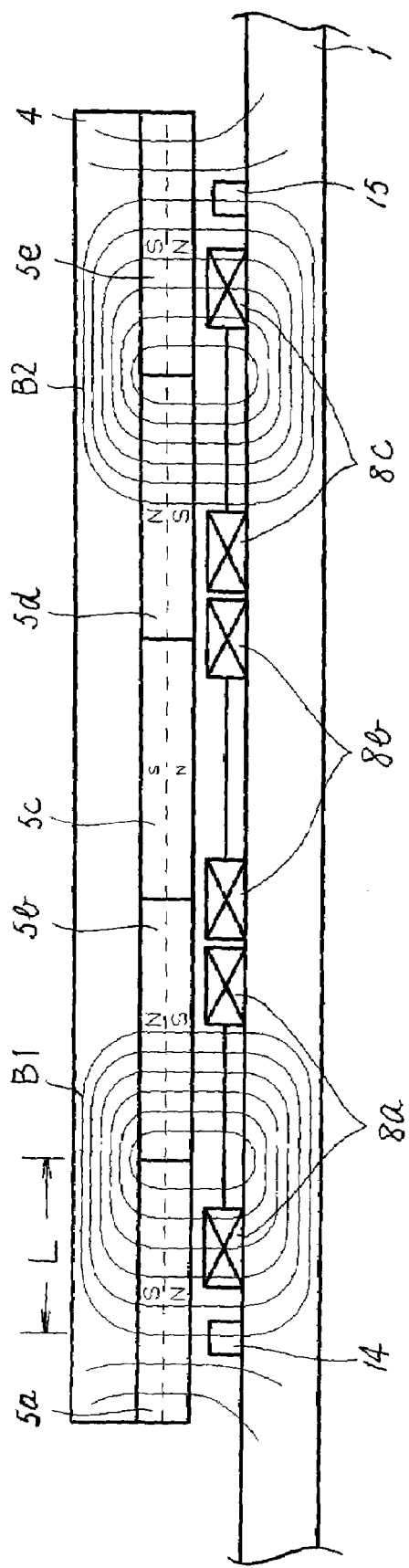
FIG. 8 is a diagram illustrating a relative position of the bed and the movable table which is in a neutral position in a second embodiment.

In the second embodiment, when the movable table 4 is in the neutral position shown in FIG. 8, the flux loops B1 and B2 pass through the respective magnetic members 14 and 15 in the vertical direction with respect to the magnetic member, so that the magnetic force is not strongest but has a maximum point. In consequence, the movable table 4 remains somewhat stable.

Figure 9:
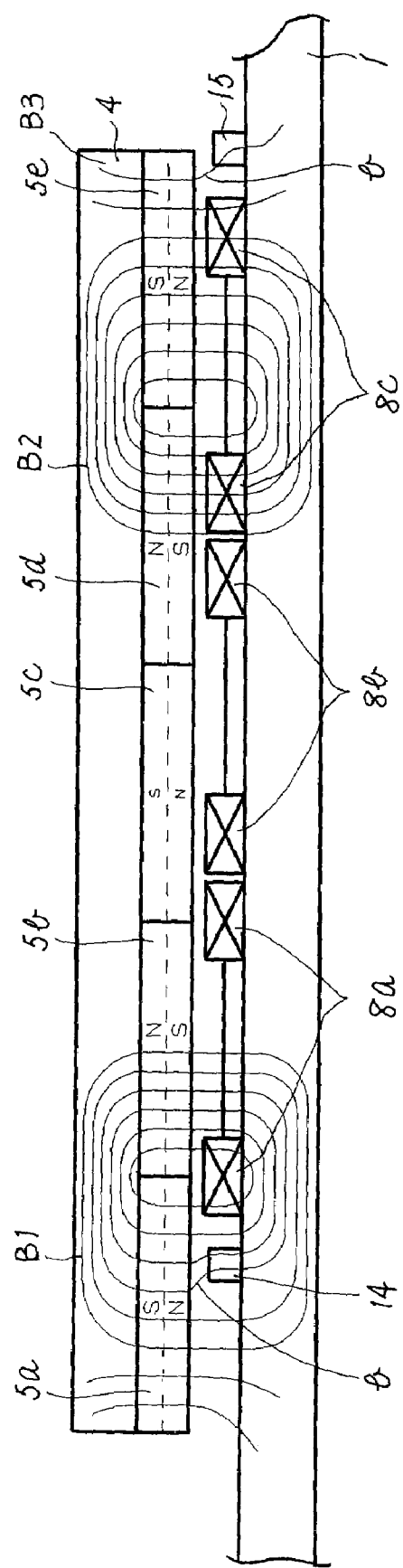
FIG. 9 is a diagram illustrating a relative position of the bed and the movable table moved slightly from the neutral position in the second embodiment.

Then, the movable table 4 moves from the neutral position shown in FIG. 8 to the position shown in FIG. 9. In this moving process, the stable state of the magnetic fluxes with respect to the magnetic members 14 and 15, which is kept in the neutral position, is disrupted. In addition, as shown in FIG. 9, only the magnetic fluxes of the flux loops B1 and B3 pass through the respective magnetic members 14 and 15. At this point, a portion b of the magnetic flux enters each of the magnetic members 14 and 15 from an oblique direction with respect to the magnetic member. The portion b of the magnetic flux acts as a resistance to the foregoing movement of the movable table 4 in the left direction. Accordingly, in a stage when the movable table 4 moves from the neutral position in either the right or left direction, the force by the portion b of the magnetic flux acts as a resistance to the movement of the movable table 4 in the left direction, so that a decelerating effect is exerted on the movable table 4. On the other hand, when the movable table 4 changes direction and moves in the right direction, the force by the portion b of the magnetic flux acts as a thrust force in the forward direction.

Figure 10:
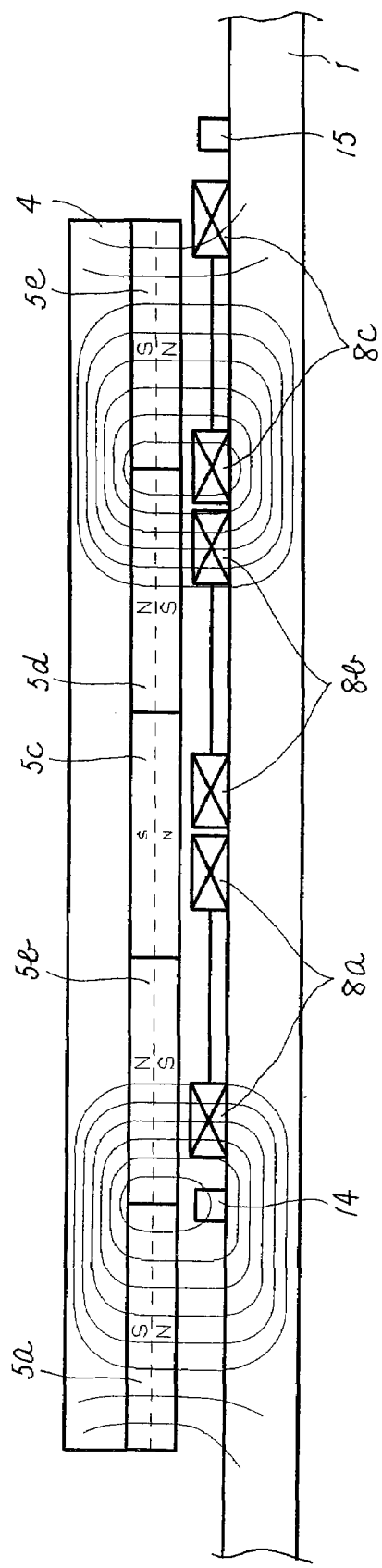
FIG. 10 is a diagram illustrating a relative position of the bed and the movable table at a stroke end in the second embodiment.

The movable table 4 moves further toward the left direction from the position shown in FIG. 9. Then, as shown in FIG. 10, the magnetic member 14 faces the boundary between permanent magnets 5a and 5b, and the magnetic member 15 is in the position where the magnetic member 15 is not or seldom affected by the magnetic flux from the permanent magnet 5e. The position shown in FIG. 10 is a stroke end of the movable table 4. When the magnetic member 14 faces the boundary between the permanent magnets 5a and 5b, the magnetic flux passes through the magnetic member 14 from approximately the stroke direction. Also, the other magnetic member 15 is in the position where it is not or seldom affected by the magnetic flux from the permanent magnet 5e. As a result, the attraction force of the permanent magnets for the magnetic member 14 alone acts on the movable table 4. In consequence, the movable table 4 can be smoothly moved from the above stroke end with a slight force.

Next, the operation in the second embodiment will be described.

The armature coils 8a to 8c are connected to a power source (not shown), and a controller (not shown) is used to control a three-phase electric current for application to the armature coils 8a to 8c. By applying the three-phase electric current to the armature coils 8a to 8c, the electromagnetic interaction between the magnetic fluxes of the permanent magnets 5 as described above and the three-phase electric current passing through the armature coils 8 allows the movable table 4 to move on the track rails 2. At this point, a direction of the movement of the movable table 4 depends on a direction of the electric current.

In the second embodiment, an operation pattern is set as follows:

| | |
|---|---|
| stroke | 12 mm, |
| load of movable table | 0.3 kg, |
| maximum velocity | 600 mm/sec, |
| acceleration and deceleration time | 0.02 sec, |
| interval | 0.1 sec, and |
| length of permanent magnet in stroke direction | about 9 mm. |

Figure 11:
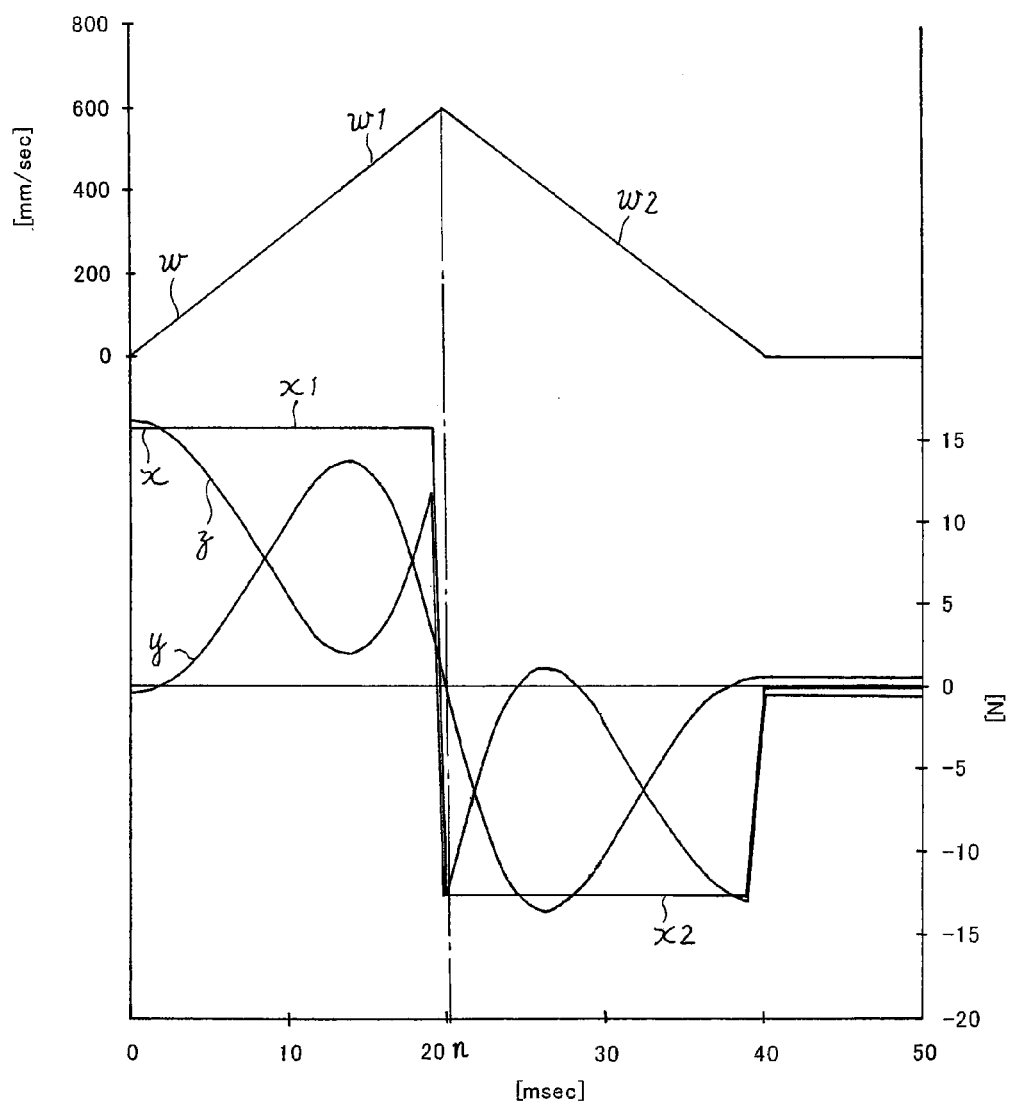
FIG. 11 is a graph showing the relationship between the velocity and the thrust in the second embodiment.

Based on the characteristics chart shown in FIG. 11, a description is given of the case where the movable table 4 moves from the stroke end shown in FIG. 10 toward the opposite direction, namely, the right direction in FIG. 10 under the above conditions. In FIG. 11, the curve w shows the velocity characteristics of the movable table 4, the curve x shows the characteristics of the thrust force of the linear motor, the curve y shows the characteristics of the force by the magnetic flux entering the magnetic member 14 (i.e. auxiliary thrust force), and the curve z shows the characteristics of the thrust force after subtracting the curve y from the curve x. The zero point of the time axis is the time when the movable table 4 is in the aforementioned stroke end.

When the movable table 4 is in the stroke end, the magnetic member 14 faces the boundary between the permanent magnets 5a and 5b and the magnetic member 15 is in the position where the magnetic member 15 is not or seldom affected by the magnetic flux from the permanent magnet 5e. The magnetic flux emerging from the permanent magnets 5a and 5b passes through the magnetic member 14 from approximately the stroke direction. As a result, the attraction force of the permanent magnets for the magnetic member 14 alone acts on the movable table 4.

For moving the movable table 4, which is in this state as shown in FIG. 10, toward the right direction in FIG. 10 along the velocity characteristics curve w in FIG. 11, the thrust force of the linear motor along the thrust characteristics curve x is necessary. That is, in the acceleration region w1 in which the movable table 4 is accelerated, the linear motor is kept outputting a constant thrust force x1. Then, at the time when the moving velocity of the movable table 4 reaches its peak, the thrust force of the linear motor is changed in direction and is reduced to x2. The thrust force x2 of the linear motor acts on the movable table 4, whereupon the movable table 4 decelerates in the deceleration region w2. Eventually, the thrust force of the linear motor is changed to zero, whereby the movable table 4 stops at a stroke end opposite the stroke end illustrated in FIG. 10. In the movement from one stroke end to the other stroke end, the point n in FIG. 11 corresponds to the neutral position shown in FIG. 8.

Next, a description will be given of the acting force of the magnetic flux on each of the magnetic members 14 and 15 in the moving process of the movable table 4 in the right direction as described above, on the basis of the auxiliary thrust-force characteristics curve y in FIG. 11. The acting force of the magnetic flux on each of the magnetic members 14 and 15 is close to zero when the movable table 4 is at the stroke end shown in FIG. 10. In this state, when the movable table 4 moves to the position shown in FIG. 9, a portion b of the magnetic flux enters each of the magnetic members 14 and 15 from an oblique direction. The portion b of the magnetic flux acts as a thrust force in the forward direction on the foregoing movement of the movable table 4 in the right direction. When the movable table 4 further moves toward the neutral position shown in FIG. 8, the auxiliary thrust force y reaches its peak slightly before the neutral position.

After the auxiliary thrust force passes the peak, the acting force of the portion b of the magnetic flux reduces, and at the time when the movable table 4 reaches the neutral point n, the auxiliary thrust force y decreases to zero. After the movable table 4 further moves from the neutral point n toward the right direction in FIG. 8, the auxiliary thrust force y acts as a thrust force in the direction opposite to the moving direction of the movable table 4, that is, as a resistance.

Then, eventually, the movable table 4 reaches the stroke end opposite the stroke end shown in FIG. 10. Thereupon, as in the case of FIG. 10, the magnetic member 15 faces the boundary between permanent magnets 5d and 5e, and, at this point, the magnetic flux passes through the magnetic member 15 from approximately the stroke direction. As a result, the attraction force of the permanent magnets for the magnetic member 15 alone acts on the movable table 4.

The characteristics graph z in FIG. 11 shows the thrust force characteristics which is obtained by subtracting the characteristics of the auxiliary thrust force y produced by the action of the magnetic fluxes on the magnetic members 14 and 15 from the thrust force x of the linear motor as described earlier. At this point, the effective auxiliary thrust force z was 4.76N, and the effective thrust force z of the linear motor alone without the magnetic members 14 and 15 was 7.58N. In this manner, the effective auxiliary thrust force is smaller than the effective thrust force. This means that a reduction in energy gained by electric power or the like is possible. Accordingly, if the amount of energy supply is approximately the same as in the conventional case, an increase in the speed of movement of the movable table 4 and an improvement of response performance can be achieved.

A feature of the second embodiment is that the maximum stroke of the movable table from one end to the other end can be increased. For example, in the first embodiment, a length (9 mm) corresponding to a single permanent magnet in the stroke direction is the maximum stroke in one direction. This is because the limitation of the magnetic member 11 is the amount of relative movement of the magnetic member 11 from the neutral position to the boundary between the permanent magnets 5b and 5c or the permanent magnets 5c and 5d. By contrast, in the second embodiment, the amount of relative movement of each of the magnetic members 14 and 15 in one direction is a length L in FIG. 8. It is clear that the amount of relative movement is greater than a length corresponding to a single permanent magnet 5 (9 mm). In consequence, the maximum stroke in the second embodiment is approximately 1.2 times to 1.8 times the length of a single permanent magnet in the stroke direction, which thus is longer than that in the first embodiment.

Figure 12:
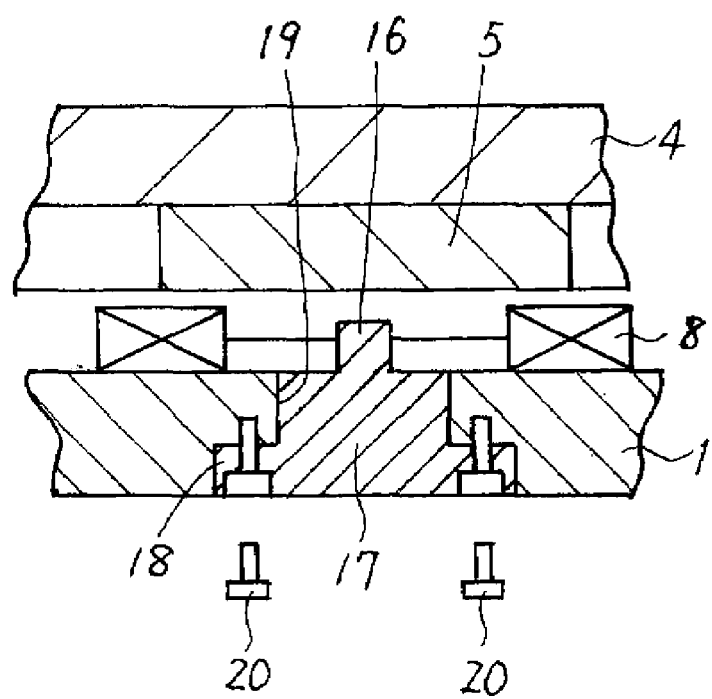
FIG. 12 is a partially enlarged sectional view of a third embodiment.
Figure 13:
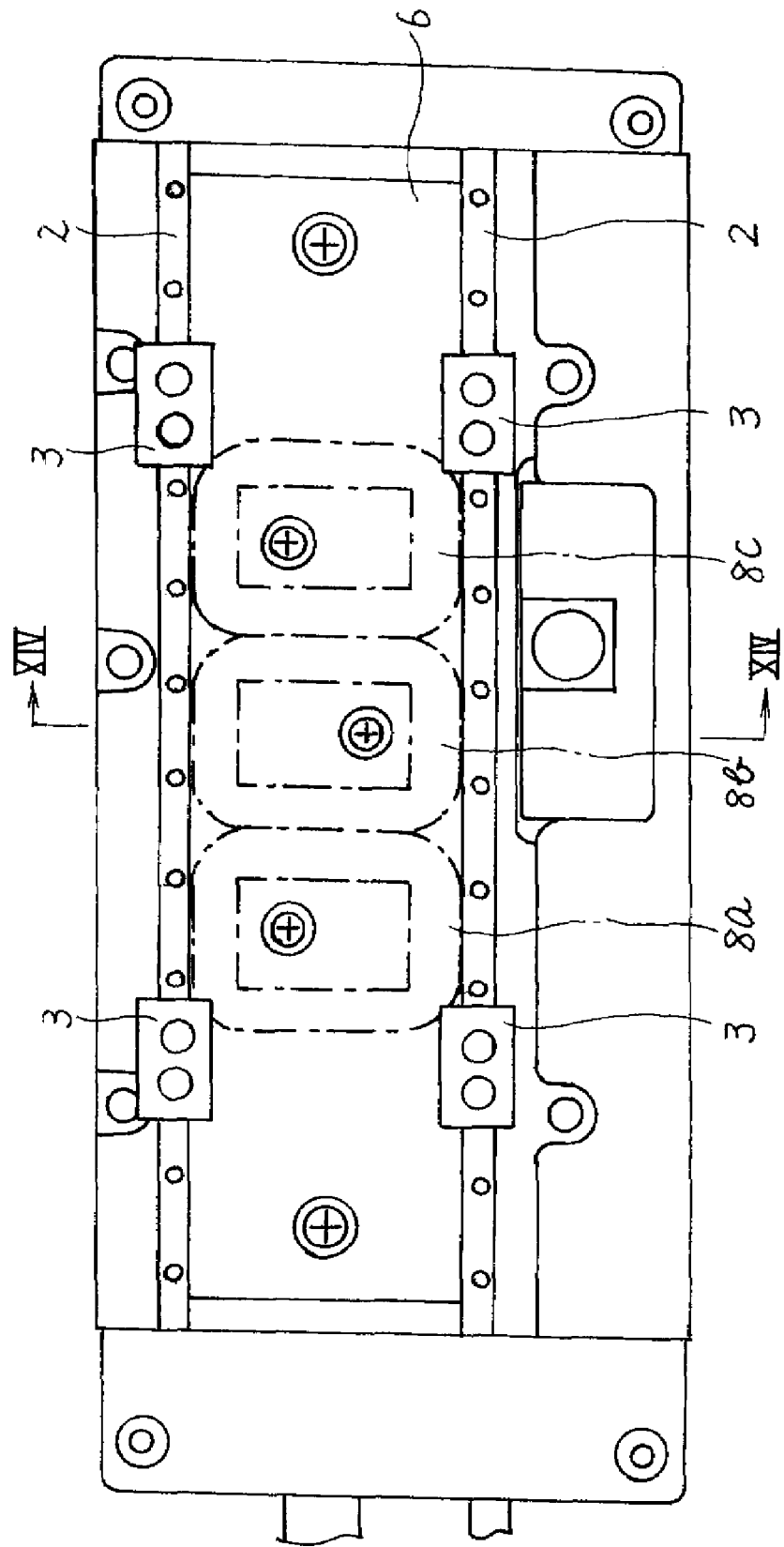
FIG. 13 is a plan view illustrating a bed of a conventional linear drive system.

A third embodiment illustrated in FIG. 12 is the same as the first and second embodiments except for a magnet member 16 implanted from the underside of the bed 1 to project from the top surface thereof. Specifically, as shown in FIG. 12, a fitting portion 17 is formed in a lower portion of the magnetic member 16. A flange 18 is formed on a lower face of the fitting portion 17. The bed 1 has a through hole 19 into which the fitting portion 17 and the flange 18 are fitted. By fitting the fitting portion 17 and the flange 18 into the through hole 19, the magnetic member 16 projects from the bed 1.

The magnetic member 16 is fixed to the bed 1 with bolts 20 passing through the flange 18. A critical feature of the third embodiment is that the magnetic member 16 is easily combined with the bed 1. The magnetic member according to the third embodiment can be retrofitted to a bed 1 of an existing linear drive system which is originally equipped with no magnetic member.

The invention claimed is:

1. A linear drive system comprising:
a pair of first and second opposing mobile units,
a plurality of permanent magnets on the first mobile unit which are divided from each other in a stroke direction of the first mobile unit,
one or more armature coils on the second mobile unit which face the permanent magnets, wherein, when an electric current is passed through the armature coils, an electromagnetic interaction between the armature coil current and magnetic fluxes of the permanent magnets produces a thrust force used for relative movement between the first and second mobile units, and
a magnetic member on the second mobile unit in a position corresponding to either a maximum point or a vicinity of the maximum point of a magnetic force of the permanent magnets when the second mobile unit is in a neutral position, wherein a pair of flux loops passes through the magnetic member symmetrically in the center of the magnetic member, so that when the first and second mobile units move from the neutral position, the magnetic force of the permanent magnets acts in the stroke direction on the magnetic member.

2. A linear drive system according to claim 1, wherein the magnetic member is provided on the second mobile unit and in a position corresponding to either the maximum point or the vicinity of the maximum point of the magnetic force of the permanent magnets when the first mobile unit is in the neutral position in the stroke direction, and has a sufficient width to be affected by the pair of flux loops generated between pairs of adjacent permanent magnets.

3. A linear drive system according to claim 1, wherein the magnetic member is constituted of a pair of first and second magnetic members, and the first and second magnetic members are provided in relational positions which are respectively outside the outermost armature coils on the second mobile unit and respectively face the outermost permanent magnets which are provided on the first mobile unit, and when the first and second mobile units relatively move a full stroke, the first magnetic member is in a position facing a boundary between a pair of permanent magnets and the second magnetic member is in a position where the second magnetic member is not or seldom affected by the magnetic flux of the corresponding outermost permanent magnet.

4. A linear drive system according to claim 1, wherein the magnetic member extends through the second mobile unit and projects from a face of the second mobile unit facing the permanent magnets provided on the first mobile unit.

5. A linear drive system according to claim 2, wherein the magnetic member extends through the second mobile unit and projects from a face of the second mobile unit facing the permanent magnets provided on the first mobile unit.

6. A linear drive system according to claim 3, wherein the magnetic member extends through the second mobile unit and projects from a face of the second mobile unit facing the permanent magnets provided on the first mobile unit.

* * * * *